United States Patent
Casanave et al.

(10) Patent No.: US 8,460,633 B2
(45) Date of Patent: Jun. 11, 2013

(54) PROCESS FOR THE PRODUCTION OF HYDROGEN WITH VERY HIGH PURITY FROM ALCOHOLS THAT COMPRISE AT LEAST TWO CARBON ATOMS

(75) Inventors: Dominique Casanave, St Symphorien d'Ozon (FR); Nicolas Boudet, Lyons (FR)

(73) Assignee: IFP Energies nouvelles, Rueil-Malmaison Cedex (FR)

( * ) Notice: Subject to any disclaimer, the term of this patent is extended or adjusted under 35 U.S.C. 154(b) by 2558 days.

(21) Appl. No.: 11/075,965

(22) Filed: Mar. 10, 2005

(65) Prior Publication Data
US 2005/0244329 A1 Nov. 3, 2005

(30) Foreign Application Priority Data
Mar. 10, 2004 (FR) ...................................... 04 02513

(51) Int. Cl.
*C01B 3/26* (2006.01)
(52) U.S. Cl.
USPC ......... 423/652; 423/648.1; 423/650; 423/651
(58) Field of Classification Search
USPC ............................. 423/648.1, 650, 651, 652
See application file for complete search history.

(56) References Cited

U.S. PATENT DOCUMENTS

| 3,446,594 | A | 5/1969 | Buswell et al. |
| 4,600,529 | A * | 7/1986 | Hallen et al. .................. 252/373 |
| 5,736,026 | A * | 4/1998 | Patel et al. ..................... 205/343 |
| 6,221,117 | B1 | 4/2001 | Pledger et al. |
| 6,555,088 | B1 * | 4/2003 | Baumann et al. ............. 423/656 |
| 6,623,719 | B2 * | 9/2003 | Lomax et al. ................. 423/652 |
| 2002/0155062 | A1 | 10/2002 | Lightner |
| 2003/0022950 | A1 | 1/2003 | Keppeler |
| 2003/0095919 | A1 * | 5/2003 | Hirose et al. ............... 423/648.1 |
| 2003/0099593 | A1 | 5/2003 | Cortright et al. |

FOREIGN PATENT DOCUMENTS
WO   WO 01/00320 A   1/2001

* cited by examiner

*Primary Examiner* — Paul Wartalowicz
(74) *Attorney, Agent, or Firm* — Millen, White, Zelano & Branigan, P.C.

(57) ABSTRACT

Process for the production of high-purity hydrogen from an ethanol or higher-alcohol feedstock, employing a steam reforming unit, a carbon monoxide conversion unit and a membrane separation unit and comprising intense thermal integration that is obtained by combustion under the control of an effluent of the process so as to provide the calories that are necessary to the steam reforming reaction.

10 Claims, 1 Drawing Sheet

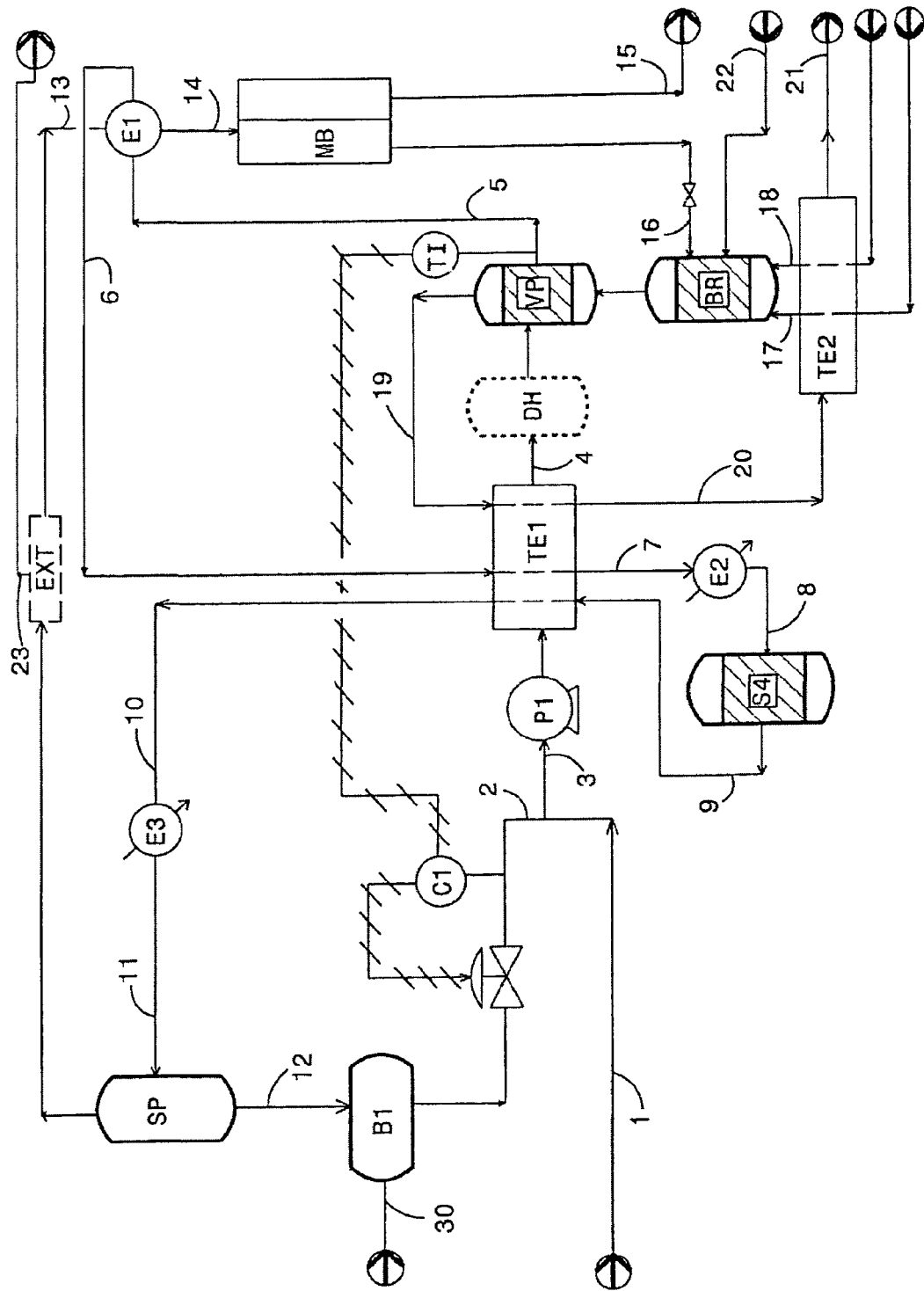

PROCESS FOR THE PRODUCTION OF HYDROGEN WITH VERY HIGH PURITY FROM ALCOHOLS THAT COMPRISE AT LEAST TWO CARBON ATOMS

TECHNICAL FIELD OF THE INVENTION AND EXAMINATION OF THE PRIOR ART

The invention relates to a process for the production of hydrogen with very high purity from a hydrocarbon feedstock of the family of alcohols by steam reforming (or water steam reforming) at a temperature of close to 700° C. that employs a known catalyst for this type of reaction or with a catalyst described in French Application 03/08077.

The process that is described in this invention is essentially, preferably exactly, autothermal, in the meaning where the heat that is necessary to the steam reforming reaction is brought to more than 90%, preferably more than 95%, and more preferably 100% by the combustion of an effluent that is generated during the process.

In the process of this invention, the use of a membrane separator also makes it possible to obtain a very high purity level of the hydrogen.

The prior art comprises a large number of processes for production of hydrogen, or more generally a mixture of hydrogen and carbon monoxide that is called synthesis gas, that generally do not reach the level of purity claimed by this invention.

Application US 2003/0022950 describes a process for the production of a gas that contains hydrogen for the purpose of supplying a fuel cell employing a reforming unit that works at temperatures of between 400 and 600° C. The purification of the gas that contains hydrogen is ensured by a selective oxidation stage.

The degree of purity of the hydrogen that is obtained by this reaction is insufficient for a certain number of applications, in particular for the use of hydrogen in the proton exchange membrane-type fuel cells (PEM or Proton Exchange Membrane according to English terminology) for which the acceptable carbon monoxide content should be between 50 ppm part per million by weight and 10 ppm according to the data of various manufacturers.

The problem that Application US 2003/0022950 seeks to resolve is that of the start-up of the hydrogen production that should take place over a period that is as short as possible to operate the reforming unit in oxidation mode for a certain time.

Patent WO 01/00320 describes a process for the production of hydrogen by steam reforming of ethanol at a temperature of between 300° C. and 800° C. in the presence of oxygen on a catalyst based on nickel and copper. The gas that contains hydrogen and carbon monoxide supplies a fuel cell, and the process comprises a unit for reduction of the carbon monoxide level by a gas-to-water displacement reaction that is carried out at 400° C. and a partial oxidation stage that is carried out at a temperature of 200° C.

Patent WO 99/61369 describes a process for the production of hydrogen for the purpose of supplying a fuel cell from ethanol from biomass that is characterized by the combined reactions of steam reforming and oxidation of ethanol (so-called authothermal process). This process specifically relates to a feedstock that consists of ethanol from biomass that contains about 50 to 60% ethanol.

Patent US 2003/0099593 describes a method for production of hydrogen from oxygenated hydrocarbon carbons (alcohols, glycerol, glucose or sorbitol) by employing a catalyst that contains a metal of group VIII and that works in a temperature zone of between 100° C. and 450° C., and at a pressure level where the reagents are either gaseous or liquid.

U.S. Pat. No. 6,387,554 repeats the operating conditions that are cited in Patent WO 99/61369 by specifying the type of reactor in which the reaction is implemented. This invention is distinguished from all the processes that are described in the prior art by the temperature level in which the steam reforming reaction is operated, close to 700° C., as well as by the feedstock/water steam molar ratio that is adjusted so as to attain and maintain autothermal conditions regardless of the fluctuations of the feedstock or other operating conditions, as will be disclosed in detail later.

The start-up problem is resolved in this invention by employing a make-up burner.

In addition, the very high purity level of the hydrogen that is obtained makes it possible to extend its applications beyond the supply of fuel cells, for example in the electronics industry (for example for the manufacture of components) or in the metallurgical industry (for example for the production of specialty steels).

SUMMARY DESCRIPTION OF THE FIGURES

FIG. 1 shows the arrangement of the process that is the object of the invention in which the necessary stages of the process appear in solid lines: steam reforming reaction (VP), carbon monoxide conversion reaction (S4), separation by membrane (MB) to recover hydrogen with a very high purity level and combustion system making it possible to provide the heat that is necessary for the steam reforming reaction.

The units that are not essential to the process but that can optionally be used in certain particular cases are shown by dotted lines.

SUMMARY DESCRIPTION OF THE INVENTION

This invention relates to a process for the production of hydrogen with very high purity from alcohols that comprise at least two carbon atoms, or oxygenated compounds of the glycerol family, or any mixture of these two types of compounds.

In the text below, alcohol feedstock will be discussed without this constituting a limitation.

The transformation of alcohol into hydrogen with very high purity will be obtained by the scheme of the following stages:

the transformation of alcohol into a hydrogen-rich gas mixture, comprising carbon oxides and methane, in a steam reforming unit that works in the presence of water steam at a temperature of close to 700° C.

the conversion of carbon monoxide into carbon dioxide in a CO conversion unit (water gas shift reaction according to English terminology) that is operated at low temperature so as to obtain an effluent whose carbon monoxide composition is less than 0.5% by volume, dry gas. In an optional way, the conversion of carbon monoxide into carbon dioxide can be carried out in a CO conversion unit at high temperature so as to obtain an effluent whose carbon monoxide composition is less than 5% by volume, dry gas.

Finally, in some cases, it could be advantageous to concatenate a high-temperature carbon monoxide conversion stage and a low-temperature carbon monoxide conversion stage. These different possibilities will be examined in the detailed description.

This unit in one or two stages is commonly called a gas-to-water displacement unit.

Preferably, the separation of dry gases, effluents of the gas-to-water displacement unit, and the water that is introduced in excess into the feedstock in a gas/liquid separator.

The purification of the hydrogen that is contained in the gas effluent of the gas/liquid separator in a membrane purification unit that makes it possible to produce hydrogen with very high purity and a methane-rich fuel flow.

The combustion of the methane-rich fuel flow, optionally mixed with a supply of alcohol in a specific burner so as to provide the heat that is necessary to the steam reforming unit.

This invention proposes a process arrangement that makes it possible to optimize the energy yield of the system by carrying out the following heat integration:

1) The evaporation and the heating of the feedstock, consisting of a water-alcohol mixture, whose composition by mass can vary from 50 to 85% by weight of water, are ensured by a train of feedstock/effluent heat exchangers.
2) The steam reforming of the water/alcohol feedstock is made authothermal by thermally coupling the endothermal steam reforming of the water/alcohol feedstock with the exothermal combustion of the methane-rich fuel flow, effluent of the membrane separation unit, optionally mixed with a supply of alcohol. It should be emphasized that this way of producing autothermicity is different from the one that is generally encountered under the name of authothermal process that consists in introducing a certain amount of oxygen or air into a mixture with the water/alcohol feedstock so as to produce simultaneously an exothermal oxidation reaction and the endothermal steam reforming reaction.

In this invention, the autothermicity is ensured by an input of calories that are generated by the combustion of an effluent of the process, whereby the composition of this effluent is adjusted continuously by means of certain operating variables of the steam reforming unit.

The invention is therefore defined as a process for the production of hydrogen with at least 95% purity from a hydrocarbon feedstock that consists of alcohols with a carbon atom number of more than 2, or oxygenated compounds of the glycerol family or any mixture of the two, comprising the following stages:

a) A catalytic steam reforming stage of the feedstock in the presence of water steam that takes place at a temperature of between 500° C. and 750° C., and preferably between 600° C. and 700° C., and at a pressure level of between 0.6 and 2 MPa, relative, and preferably between 0.8 and 1.5 MPa.
b) At least one carbon monoxide conversion reaction stage of the effluent that is obtained from stage a),
c) A final flow-membrane purification stage that results from stage b) and that makes it possible to produce a hydrogen flow, called permeate, with at least 95% purity, and a flow, called retentate, that contains methane, carbon monoxide and hydrogen; this stage preferably can comprise a separation of dry gases before the membrane purification,
d) A combustion stage of the retentate that is obtained from the membrane purification unit and that is used as the main fuel in a burner whose hot effluents supply the calories necessary to the steam reforming stage, whereby the process is characterized in that the composition of the main fuel is adjusted by means of the water steam/feedstock ratio of the mixture that enters the steam reforming stage so as to obtain a lower calorific value (PCI) of said main fuel that made it possible to satisfy, preferably exactly, the need for calories corresponding to the endothermicity of the steam reforming stage.

The catalyst that is used in the steam reforming stage is preferably a supported catalyst that contains at least one metal of group VIII, or a catalyst that consists of:

a) A solid solution-type substrate that contains a first aluminate element with a mixed or simple spinel structure (x=1; or x=0), of formula $M_xM'_{(1-x)}Al_2O_4$ in which M is at least one metal that is selected from among the following elements: magnesium, manganese, copper or zinc, and M' is at least one non-noble metal of group VIII such as nickel, iron or cobalt, deposited on a second element that is based on alumina, cerin, zirconia or any combination of these three components, whereby the proportions of elements M and M', respectively x and 1-x, can vary from 0 to 1, and the content of metals M and/or M', included between 0 and 15% by weight.
b) And an active phase that is deposited on said substrate, which contains one or more metals of group VIII.

Such a catalyst was described in French Patent Application No. 03/08077.

The molar ratio of the hydrocarbon feedstock to the water steam at the inlet of the steam reforming stage is generally more than 3 and preferably between 4 and 12.

The steam reforming stage will in some cases be preceded by a selective dehydrogenation stage that is carried out at a temperature of between 300° C. and 500° C., whereby the catalyst that is used in this stage is identical to the one that is used in the steam reforming stage, or a specific catalyst.

The carbon monoxide conversion stage can be carried out at high temperature under the following conditions: temperature of between 350° C. and 550° C., whereby the catalyst is based on iron oxide and/or based on chromium oxide or is any supported catalyst that contains at least one metal of group VIII.

In some cases, the carbon monoxide conversion stage can be carried out at low temperature under the following conditions: temperature between 180° C. and 260° C., whereby the catalyst is any catalyst that is based on copper or any supported catalyst that contains at least one metal of group VIII.

The purification stage of the hydrogen is carried out by means of a membrane separation stage that operates under the following conditions: temperature of between 300° C. and 600° C. and pressure of the gas to be purified of between 0.6 and 2 MPa, relative.

The main fuel that supplies the burner consists of the retentate of the membrane separation unit. It generally has a methane content of between 5% and 30% by volume, and preferably between 10 and 20% by volume, expressed in % by volume, dry gas.

The steam reforming stage is generally carried out in a tubular reactor that is placed inside a chamber of which one of the ends is occupied by a burner that is supplied with main fuel. The relative arrangement of the burner and the tubular reactor inside said chamber is not a specific element of this invention, and any arrangement that makes it possible to optimize the heat exchange by radiation and by convection between the smoke that is obtained from the burner and the tubular reactor will be suited to this invention.

Finally, during certain operational phases of the process, and in particular during the start-up, a start-up fuel will be used to provide the calories that are necessary to the steam reforming stage, whereby this fuel is generally a portion of the ethanol that is used as a steam reforming feedstock.

DETAILED DESCRIPTION OF THE INVENTION

Within the scope of this invention, it is a matter of producing a hydrogen-rich gas from an alcohol feedstock, and in particular ethanol. The ethanol that is used can be produced from the biomass; it can be, for example, an ethanol of grain or beet origin.

The feedstock that is used can consist of a rectified alcohol, so-called superfine alcohol, that has a purity that is generally more than 96% v/v (volume per volume).

So as to reduce the ethanol production energy cost, the feedstock that is used can be crude alcohol, called phlegm alcohol, which will have been treated first by an deacidification and elimination of sulfur-containing compounds (<0.3 ppm) and which has alcohol content is greater than or equal to 45% by volume per volume.

To carry out the steam reforming of the alcohol, the alcohol feedstock that is used can be diluted with water so that the $H_2O$/alcohol molar ratio of the mixture is greater than or equal to 3, and preferably encompassed between 4 and 12.

In a first possible configuration, the alcohol feedstock that is mixed with water is first of all evaporated and heated to a temperature of between 100 and 600° C., preferably between 300° C. and 400° C. The alcohol/evaporated water mixture is then introduced into the steam reforming unit.

In a second possible configuration, the alcohol feedstock by itself is first evaporated and heated to a temperature of between 100° C. and 400° C., preferably between 300° C. and 400° C.

The water is vaporized and the water steam that is produced is superheated to a temperature of between 500 and 900° C., preferably between 650 and 750° C. The evaporated alcohol and the superheated water steam are then introduced in a separate manner into the steam reforming unit and are brought into contact only in the catalytic section of said unit.

The steam reforming unit of the alcohol makes it possible to convert the alcohol completely into a hydrogen-rich mixture that contains carbon oxides and methane. The steam reforming unit comprises at least one catalytic zone that is operated at high temperature in which the steam reforming of the water/ethanol mixture takes place.

The total pressure in the steam reforming unit will be between 0.6 and 2 MPa, relative (1 MPa=$10^6$ Pa), and the catalytic reaction zone temperature will be between 500° C. and 750° C. and preferably between 600° C. and 700° C.

The catalyst that is used in the reaction zone at high temperature is a supported catalyst that contains at least one metal of group VIII, such as, for example, the one that is described in the French Application of Registration No. 03/08 077. This type of catalyst consists of:

a) A solid solution-type substrate that contains a first aluminate element with a mixed or simple spinel structure (x=1; or x=0) of formula $M_xM'_{(1-x)}Al_2O_4$, in which M is at least one metal that is selected from among the following elements: magnesium, manganese, copper or zinc, and M' is at least one non-noble metal of group VIII, such as nickel, iron or cobalt, deposited on a second element that is based on alumina, cerin, zirconia or any combination of these three components, whereby the proportions of elements M and M', respectively x and 1-x, can vary from 0 to 1, the content of metals M and/or M', encompassed between 0 and 15% by weight.

b) And an active phase that is deposited on said substrate, which contains one or more metals of group VIII.

In some cases, the steam reforming unit can be preceded by a specific dehydrogenation unit that makes it possible to convert at least in part the water/ethanol mixture into aldehyde.

The catalyst that is used in this dehydrogenation unit may be the same as the one that is used in the steam reforming reaction zone, or a specific catalyst, for example a supported catalyst that contains copper, as described in the article by S. Freni et Coll., published in the journal "Reaction Kinetic Catalysis Letter," Vol. 71, No. 1, 143-152 (2000), a title that it is possible to translate into French by "Lettre de Cinétique et Catalyse."

The steam reforming unit is coupled thermally to the combustion of the effluent methane-rich fuel flow of the membrane separation unit that will be called main fuel below, and whose composition is adjusted by the selection of operating conditions (pressure and $H_2O$/EtOH ratio of the feedstock) of the steam reforming unit so as to reach the thermal level that is required by the steam reforming reaction.

An increase of the total pressure induces an increase of the amount of methane produced by the steam reforming unit.

The main fuel, effluent of the membrane separation unit, will therefore be richer in methane, and its combustion in the burner will make it possible to provide a more significant amount of heat to the steam reforming unit, which makes it possible to increase the temperature of the reaction section of said unit.

On the contrary, an increase of the $H_2O$/EtOH ratio of the feedstock induces a reduction in the amount of methane produced in the steam reforming unit, which makes it possible to reduce the calorific value of the main fuel that is used in the burner, therefore ultimately reducing the temperature of the steam reforming unit.

The values of the pressure and the $H_2O$/EtOH ratio therefore make it possible to monitor the amount of CH4 in the effluent of the steam reforming unit and ultimately in the effluent of the membrane purification unit constituting the main fuel.

The calorific value of the main fuel that is used at the level of the burner for supplying calories to the steam reforming unit is adjusted continuously by preferably manipulating the water content of the water/ethanol mixture that comes into the steam reforming unit.

In practice, the operating temperature of the steam reforming unit that is set at a target value of between 500° C. and 750° C. and preferably between 600° C. and 700° C. is monitored, whereby this value is measured at the outlet of the catalytic reaction zone.

If the operating temperature has a tendency to decrease, the water flow rate is decreased at the level of the flow rate controller (C1) so as to increase the CH4 content in the effluent of the steam reforming unit (therefore in the main fuel that supplies the burner) and thus to restore the operating temperature of said unit to its target value.

In the same way, if the operating temperature of the steam reforming unit has a tendency to increase, it is possible to reduce the CH4 content in the effluent of said unit (therefore in the main fuel that supplies the burner) by increasing the water flow rate at the flow rate controller (C1).

Another way of monitoring the operating temperature of the steam reforming unit consists in making adjustments of flow rates of a supply fuel at the burner by an evaporated ethanol supply that can be added to the main fuel.

The effluent of the steam reforming unit is sent into a unit for conversion of CO that in the most general case can be divided into two sections: one section working at high temperature followed by a section working at low temperature.

In some cases, there will only be need of the section working at high temperature.

In other cases, it will be possible to use only the section with low temperature and in the most general case, the arrangement of these two sections, high temperature followed by low temperature, will be used.

The section that is operated at high temperature makes it possible to convert a portion of the CO that is contained in the effluent of the $CO_2$ vapor reforming unit and to produce hydrogen in a complementary way.

The high-temperature CO conversion catalyst can be any catalyst that is based on iron oxide and/or based on chromium oxide or any supported catalyst that contains at least one metal of group VIII.

The section that is operated at high temperature will be operated at a temperature of between 350° C. and 550° C. so as to reduce the carbon monoxide content of the effluent to a value of less than 5% by volume, dry gas.

The total pressure of the high-temperature CO conversion unit will be between 0.6 and 2 MPa, relative, and will be derived from the pressure that is selected in the steam reforming unit of the alcohol.

In the case where there is a need for a main fuel with a high PCI, it may be advantageous to maintain the CO content as it is obtained at the end of this section at high temperature, whereby the CO has a significant contribution to the PCI of the main fuel.

In the case where the PCI of the main fuel is adequate to ensure the authothermicity without the CO contribution, the effluent of the high-temperature CO conversion section is then sent into a CO conversion unit that is operated at low temperature so as to reduce the carbon monoxide content of the effluent to a value that is less than or equal to 1% by volume, dry gas, and preferably 0.5%.

Finally, in the case where the steam reforming unit produces an effluent in which the CO content is already relatively low, typically less than 7% by volume, dry gas, and preferably less than 5%, only the low-temperature section of the CO conversion unit can be used.

The low-temperature CO conversion catalyst can be an), catalyst that is based on copper, or any supported catalyst that contains at least one metal of group VIII.

The low-temperature conversion section will be operated at a temperature of between 180° C. and 260° C.

The total pressure of the low-temperature CO conversion section will be between 0.6 and 2 MPa, relative, and will be derived from the pressure that is selected in the vapor reforming unit of alcohol.

The effluent of the CO conversion unit, regardless of the variant selected, is cooled to a temperature of between 15 and 40° C., before being sent into a gas-liquid separator, from which is extracted:
  a) A liquid effluent that contains primarily the water that is recycled at the inlet of the steam reforming reactor,
  b) A gas effluent that contains primarily hydrogen, carbon dioxide and methane that is sent to the membrane purification unit.

The membrane that is used in said unit can be any metallic membrane that is based on Pd or Pt, or any membrane that is based on microporous ceramic materials that are hydrogen-selective.

The membrane purification unit will be operated at a temperature of between 300° C. and 600° C., and at a pressure of between 0.6 and 2 MPa, relative, which will be derived from the pressure that is selected from the steam reforming section of the alcohol.

The gas effluent that has passed through the membrane, called a permeate, is the hydrogen with very high purity that is generally more than 95%, and preferably more than 99%.

The carbon monoxide content of the permeate is less than 200 ppm and preferably less than 50 ppm by volume.

The gas effluent that has not passed through the membrane is called a retentate. For the most part, it contains carbon dioxide, methane and residual hydrogen that could not be extracted from the membrane purification unit.

The residual hydrogen content in the retentate depends on the operating conditions of the membrane purification unit, in particular the difference in pressure between the retentate and the permeate. If necessary, it will be possible to adjust this pressure difference so as to vary the amount of hydrogen contained in the retentate that directly conditions the PCI of the main fuel.

Nevertheless, this possibility of adjusting the PCI of the main fuel will only be used rarely to the extent that the pressure level of the hydrogen that is produced, permeate side, is in general set by the equipment in which said hydrogen will be used.

The retentate that is obtained from the membrane purification unit constitutes the main fuel whose calorific value essentially depends on the content of methane and hydrogen.

This main fuel is sent into a burner in which the total combustion of the retentate takes place optionally with a supply of evaporated ethanol. About 50% of the energy that is released by the combustion of the main fuel is transmitted to the catalytic reaction zone of the steam reforming unit primarily by radiation, whereby the burner is generally used inside a radiation zone, called a chamber, inside of which is located the steam reforming reaction zone.

The relative positions of the burner and the catalytic steam reforming reaction zone will not be described in detail in this patent, but according to a variant that is known to one skilled in the art, the burner and the tube bundle of the reaction catalytic section will be placed inside a chamber such that the flame that is generated by the burner as well as the combustion smoke can exchange their heat with the tube bundle of the reaction zone in the most effective way possible.

The fraction of the energy that is not transmitted to the steam reforming reaction zone consists of the considerable heat of the smoke exiting the chamber at a temperature of between 900° C. and 1000° C. This considerable heat is used to evaporate and superheat the water/alcohol feedstock that supplies the steam reforming reactor, then for preheating the combustion air, and optionally to evaporate the supply fuel that is necessary for the combustion.

The start-up phase of the process requires a transitory energy supply that is independent of the retentate that is still not completely available.

For this purpose, the burner that is used should have, in addition to the injection system of the main fuel, an injector or an equivalent device that is used only for the start-up, thus making it possible to burn a sprayed liquid. In general, this liquid will be ethanol, and most often a portion of the ethanol that is used such as a steam reforming feedstock.

The text below will be better understood by means of FIG. 1.

The liquid ethanol feedstock is mixed under ambient conditions (flow 1) with the flow of liquid water under ambient conditions (flow 30, then 2). The mixture of these two flows constitutes flow 3, a liquid mixture whose $H_2O/EtOH$ ratio corresponds to the ratio that is required by the steam reforming reaction and whose pressure level is brought to the value that is required by the reaction by means of pump (P1).

Flow 3 is then evaporated and superheated in exchange train TE1 to reach the initial operating conditions in steam reforming unit VP (flow 4).

The effluent of the steam reforming unit (flow 5) is then cooled successively in exchanger E1, then via flow 6 in exchange train TE1, and finally in exchanger E2 via flow 7.

A temperature measurement (noted Ti) taken on flow 5 makes it possible to control the temperature of flow 5 by means of controller C1 that adjusts the flow rate of flow (2).

Exchanger E2 uses a coolant, generally cold water, and generates flow (8) at a temperature that makes it possible to operate the low-temperature CO conversion reaction, typically 180° C.

In the most frequent case, flow (8) supplies low-temperature CO conversion unit (S4) from which is drawn a flow (9) that has a CO content of less than 0.5% by volume (dry gas).

Flow (9) is cooled successively in exchange train (TE1) then in an exchanger E3 that uses a coolant, generally cold water, which allows the partial condensation of the water that is contained in the flow (10).

Flow (11) that leaves exchanger E3 supplies a gas/liquid separator (SP) from which is drawn a) a liquid flow of water (flow 12) that is recycled to the supply of steam reforming unit (VP) by passing through water storage tank (B1) and b) a gas flow (13) that is reheated by passage in exchanger E1 and becomes flow (14).

Reheated flow (14) is sent to membrane separation unit (MB) from which is extracted a permeate (flow 15) that consists of high-purity hydrogen and a retentate (flow 16) that contains a majority of CH4 and the non-recovered portion of H2 in the permeate that constitutes the main fuel.

Main fuel (flow 16) and a flow of preheated air (flow 17) as well as optionally the secondary fuel (flow 18) supply the burner (BR).

The calories that are necessary to the steam reforming reaction that is used in the VP unit are provided primarily by the radiation zone or chamber that surrounds the burner.

The smoke that is generated by the combustion of the main fuel and optionally supply fuel (flow 19) leaves the steam reforming unit to supply exchange train (TE1) in which they yield their calories to the water/ethanol mixture (flow 3) that after preheating, evaporation and superheating supplies the steam reforming unit (flow 4).

The smoke (flow 20) that leaves exchange train (TE1) is cooled in exchange train (TE2) that makes it possible to preheat the air that supplies the burner (flow 17) and the secondary fuel (flow 18).

The smoke that leaves exchange train TE2 (flow 21) is released into the atmosphere.

During the start-up period, a start-up fuel (flow 22) supplies burner (BR). CO2 optionally can be extracted in extractor EXT to produce CO2 via flow 23.

EXAMPLE ACCORDING TO THE INVENTION

The example below illustrates the arrangement of the process according to the invention in which a low-temperature CO conversion unit is used.

For each of the flows described in the detailed description, the table below provides the value of its mass rate and its temperature.

For flows 5, 9 and 16, in addition the composition is provided.

From an ethanol feedstock of grain origin and for a water/ethanol molar ratio of 8, an operating pressure of 1.1 MPa absolute, and a temperature of 700° C. at the reaction zone of the steam reforming unit, a molar yield of 4.15 mol of H2 produced per mol of consumed ethanol and a thermal yield of 80.5% are obtained.

The thermal yield is defined as the ratio of the thermal output of the hydrogen that is produced (based on its PCI) to the thermal output of the consumed ethanol (based on its PCI).

| Flow No. | Temperature (° C.) | Mass Rate (kg/h) |
| --- | --- | --- |
| 1 | 20 | 460 |
| 2 | 20 | 1440 |
| 3 | 20 | 1900 |
| 4 | 550 | 1900 |
| 5 | 700 | 1900 |
| 6 | 545 | 1900 |
| 7 | 185 | 1900 |
| 8 | 180 | 1900 |
| 9 | 224 | 1900 |
| 10 | 20 | 1900 |
| 11 | 20 | 1900 |
| 12 | 20 | 1027 |
| 13 | 20 | 873 |
| 14 | 350 | 873 |
| 15 | 350 | 83.25 |
| 16 | 350 | 789.75 |
| 17 | 300 | 1329.5 |
| 18 | 200 | 0.5 |
| 19 | 919 | 2119.75 |
| 20 | 474 | 2119.75 |
| 21 | 322 | 2119.75 |
| 22 | / | 0 |

| | Composition in % By Volume | | |
| --- | --- | --- | --- |
| | Flow 5 | Flow 9 | Flow 16 |
| $H_2O$ | 50.5 | 46.5 | 0.6 |
| $H_2$ | 33.2 | 37.2 | 17 |
| $CH_4$ | 2.9 | 2.9 | 14.5 |
| $CO_2$ | 9.3 | 13.3 | 67.3 |
| CO | 4.1 | 0.1 | 0.6 |

To illustrate the method for regulating the steam reforming unit according to the invention, it is assumed that the temperature of the steam reforming unit measured by thermocouple Ti in flow (5) passes from 700° C. to 710° C.

The correction to be performed on the water flow rate (flow 2) is as follows: the flow rate should pass from 1440 kg/h to 2160 kg/h, which corresponds to an $H_2O$/alcohol molar ratio passing from 8 to 12 and makes it possible to decrease the temperature of flow (5) to 700° C.

This correction can be made automatically by means of a regulation loop that acts on the opening of the valve that controls the water flow rate.

The invention claimed is:

1. A process for the production of hydrogen with at least 95% purity from a hydrocarbon feedstock comprising alcohols with a carbon atom number of more than 2, or oxygenated compounds of the glycerol family or of any mixture of the two, said process comprising the following stages:
   a) A catalytic steam reforming stage of the feedstock at a given feedstock/steam ratio at a temperature of between 500° C. and 750° C., and at a pressure level of between 0.6 and 2 MPa, relative,
   b) At least one carbon monoxide conversion reaction of the resulted effluent obtained from stage a),
   c) A final membrane purification stage of the effluent from stage b) so as to produce a hydrogen flow, called permeate, with at least 95% purity, and a flow, called retentate, that contains methane, carbon monoxide and hydrogen,
   d) A combustion stage of the retentate obtained from the membrane purification unit and that is used as the main fuel in a burner whose hot effluents supply calories necessary to the steam reforming stage, adjusting to the composition of the main fuel the steam/feedstock ratio of the mixture that enters the steam reforming stage so as to adjust to a lower calorific value (PCI) of said main fuel so as to satisfy the need for calories corresponding to the endothermicity of the steam reforming stage, and wherein the ratio by mots of the hydrocarbon feedstock to the steam at the inlet of the steam reforming stage is 12, and the catalyst used in the steam reforming stage is a supported catalyst that contains at least one metal of group VIII, or a catalyst comprising:

a) A solid solution-type substrate that contains a first aluminate element with a mixed or simple spinel structure (x=1; or x=0), of formula $M_x, M'_{(1-x)}Al_2O_4$ in which M is at least one metal from among the following elements: magnesium, manganese, copper or zinc, and M' is at least one non-noble metal of group VIII, nickel, iron or cobalt, deposited on a second element based on alumina, cerin, zirconia or any combination thereof, the proportions of elements M and M', respectively x and 1-x, that can vary from 0 to 1, and the content of metals M and/or M', included between 0 and 15% by weight, and b) an active phase that is deposited on said substrate, which contains one or more metals of group VIII.

2. A process according to claim 1, wherein during at least one operational phase of the process, a start-up fuel is used to provide the calories that are necessary to the steam reforming stage, whereby this fuel is a portion of the ethanol that is used as a steam reforming feedstock.

3. A process according to claim 2, wherein the at least one operation phase of the process is during the start-up.

4. A process according to claim 1, wherein the steam reforming stage is preceded by a selective dehydrogenation stage that is carried out at a temperature of between 300° C. and 500° C., whereby the catalyst that is used in this stage is either identical to the one that is used in the steam reforming stage or a specific catalyst.

5. A process according to claim 1, wherein the carbon, monoxide conversion stage is carried out at high temperatures under the following conditions: temperature of between 350° C. and 550° C., whereby the catalyst is based on iron oxide and/or based on chromium oxide or is any supported catalyst that contains at least one, metal of group VIII.

6. A process according to claim 1, wherein the carbon monoxide conversion stage is carried out at low temperatures under the following conditions: temperature of between 180° C. and 260° C., whereby the catalyst is any catalyst that is based on copper or any supported catalyst that contains at least one metal of group VIII.

7. A process according to claim 1, wherein the final membrane separation stage works under the following conditions: temperature of between 300° C. and 600° C., and pressure of the gas to be purified between 0.6 and 2 MPa, relative.

8. A process according to claim 1, wherein the main fuel that supplies the burner has a methane content of between 5% and 30% by volume of dry gas.

9. A process according to claim 1, wherein the steam reforming stage is carried out in a tubular reactor that is placed inside a chamber of which one of the ends is occupied by a burner that is supplied with the main fuel.

10. A process according to claim 1, wherein the steam/feedstock ratio is adjusted so that the main fuel substantially exactly satisfies the endothermicity of the steam forming stage.

* * * * *

UNITED STATES PATENT AND TRADEMARK OFFICE
CERTIFICATE OF CORRECTION

PATENT NO. : 8,460,633 B2
APPLICATION NO. : 11/075965
DATED : June 11, 2013
INVENTOR(S) : Dominique Casanave Page 1 of 1

It is certified that error appears in the above-identified patent and that said Letters Patent is hereby corrected as shown below:

In the Claims

Column 11, line 6 reads "mots", should read --mols--;

Column 11, line 7 reads "stage is 12", should read --stage is 4-12--;

Column 12, lines 5 and 6 read "carbon, monoxide", should read --carbon monoxide--;

Column 12, line 10 reads "one, metal", should read --one metal--.

Signed and Sealed this
Fifteenth Day of October, 2013

Teresa Stanek Rea
*Deputy Director of the United States Patent and Trademark Office*